July 5, 1927.
J. T. AMISS
1,634,391
AUTOMOBILE JACK
Filed Feb. 6, 1925
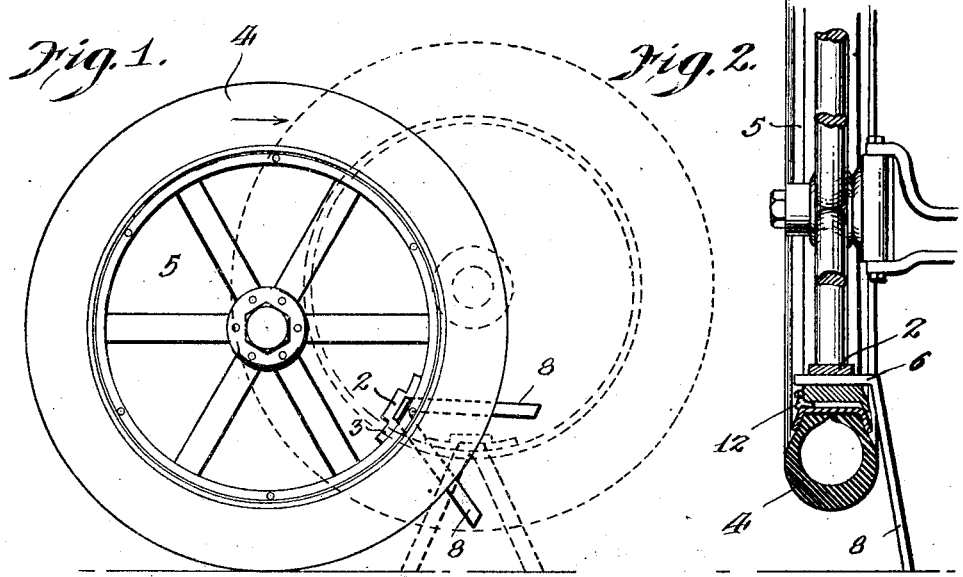
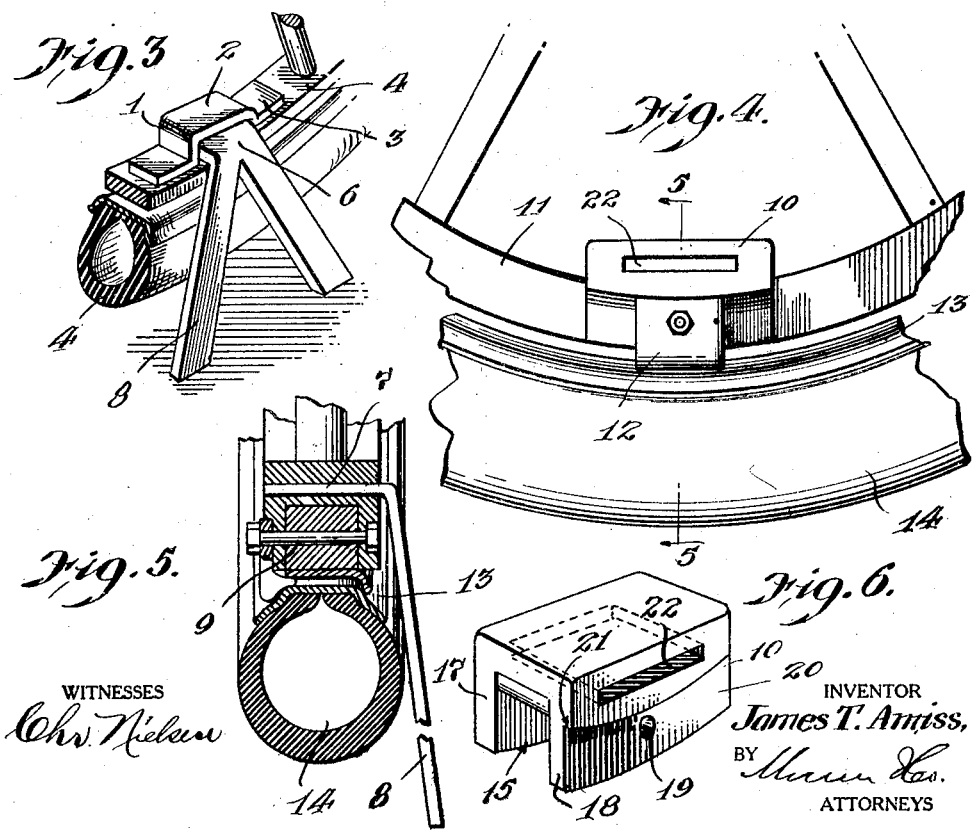
INVENTOR
James T. Amiss,
BY
ATTORNEYS Patented July 5, 1927.

1,634,391

UNITED STATES PATENT OFFICE.

JAMES TOWNSEND AMISS, OF BATON ROUGE, LOUISIANA.

AUTOMOBILE JACK.

Application filed February 6, 1925. Serial No. 7,367.

This invention is an improvement in automobile jacks.

An object of this invention is to provide a device of this character capable of quick and easy attachment to a vehicle wheel which, when so attached, will cause the wheel to be elevated from the ground upon rotation of the wheel.

A further object of the invention is the provision of a device of this character which is extremely simple of construction and application.

With these and other objects in view as will appear as the description proceeds the invention consists of the novel features of construction, combinations of elements and arrangements of parts hereinafter to be fully described and claimed.

A full and complete understanding of the invention may be obtained from a consideration of the following detailed description, taken in connection with the accompanying drawing forming a part of this specification, it being understood that while the drawing shows practical forms of the invention, the latter is not to be confined to strict conformity with the showing thereof, but may be changed or modified, so long as such changes and modifications mark no material departure from the salient features of the invention, as specifically pointed out and claimed.

In the accompanying drawing wherein similar reference numerals designate similar parts throughout the several views, Figure 1 is a side elevation of the device operatively associated with an automobile wheel, illustrating by dotted lines the relative positions of the parts when the wheel has been slightly rotated from the full line position in the direction indicated by the arrow.

Figure 2 is a vertical sectional view through the wheel and jack as shown in dotted lines in Figure 1.

Figure 3 is a perspective view of the device as applied on a wheel having a metallic rim.

Figure 4 is an enlarged fragmentary elevation illustrating the form of housing employed on wooden wheels.

Figure 5 is a vertical sectional view taken on the line 5—5 of Figure 4, and,

Figure 6 is an enlarged perspective view of the housing shown in Figures 4 and 5.

This invention broadly considered, consists of a housing, adapted to be secured to and extend inwardly from the rim of a vehicle wheel, and formed to operatively receive a projecting portion of a one piece jack to support the latter with its diverging arms extending a short distance past the outer periphery of the tire mounted on the rim.

In Figures 1, 2, and 3 of the drawing is illustrated the device as applied to a vehicle wheel having a metallic rim upon which the tire is directly fitted, and in these figures the numeral 1 indicates a metallic housing consisting of a strip bent up to provide a central offset portion 2 and the ends 3 which are preferably welded or otherwise rigidly secured to the rim 4 of the vehicle wheel, generally indicated at 5.

The jack 6 is constructed of a single piece of heavy sheet iron or steel and is substantially V-shaped with the apex 7 of the V being bent up at an angle to the diverging arms 8 and of a size to snugly fit within the housing 1, as best shown in Figure 2 of the drawing.

In Figures 4, 5, and 6 is illustrated the device as applied to a wheel having a wooden rim, in which case a bolt 9 serves to hold the housing 10 in operative position on the rim 11 in addition to supporting one of the lugs 12 which secure the demountable rim 13 and tire 14 in position.

The housing 10 is a substantially rectangular metallic block which is recessed or cut out centrally of its under surface as at 15 to fit over the wheel rim 11 with the depending walls 17 and 18 engaging the respective sides of the rim. The walls 17 and 18 are provided with alined apertures 19 to receive bolt 9 and the wall 18 is recessed on its outer surface, as at 20, to receive the lug 12 which is also traversed by the bolt, the free ends of the walls, the bottom of the cut out portion, and the shoulder 21, all being suitably curved to conform to the curvature of the rim 11. A rectangular opening 22 is provided in the housing 10 to receive the rectangular extensions 7 of the jack hereinbefore described.

In the practice of the invention, each wheel of the vehicle is provided with a jack supporting housing extending inwardly from the interior periphery of the wheel rim. In case of a puncture or any other trouble necessitating the removal of a tire, the driver has only to insert the shank extension 7 of the jack 6 into the housing with the diverging arms 8 extending as shown in solid lines in Figure 1 of the drawing between the wheel and the vehicle. The brakes of the vehicle being released the latter may be moved a slight distance in a direction to cause the wheel to rotate in the direction indicated by the arrow whereupon the engagement of one of the arms 8 with the road will raise the wheel and support it as indicated by dotted lines in Figure 1. To lower the wheel it is only necessary to move the vehicle a slight distance in either direction and the jack may be removed.

Having thus fully described the invention it is obvious that a vehicle jack has been provided which is extremely simple in construction and can therefore be manufactured at small cost and which performs its functions with considerably less labor to the driver of the vehicle than jacks now in use.

I claim:

In a device of the class described, a felly of a vehicle wheel, an anchor rigidly secured to the inner periphery of the felly and comprising an inverted U-shaped member projecting radially inwardly from the felly and having the ends of the legs thereof rigidly connected with the inner face of the felly, with the U-shaped member cooperating with the inner face of the felly to form a socket, and a V-shaped jack having a pair of diverging arms adapted to engage a road at their free ends, and a lug projecting at an angle from the apex of the jack and integral therewith and adapted to be received between the U-shaped member and the inner face of the felly.

JAMES TOWNSEND AMISS.